G. F. CRIPPEN.
BEARING FOR SHAFTS.
APPLICATION FILED DEC. 1, 1916.
1,262,925.
Patented Apr. 16, 1918.
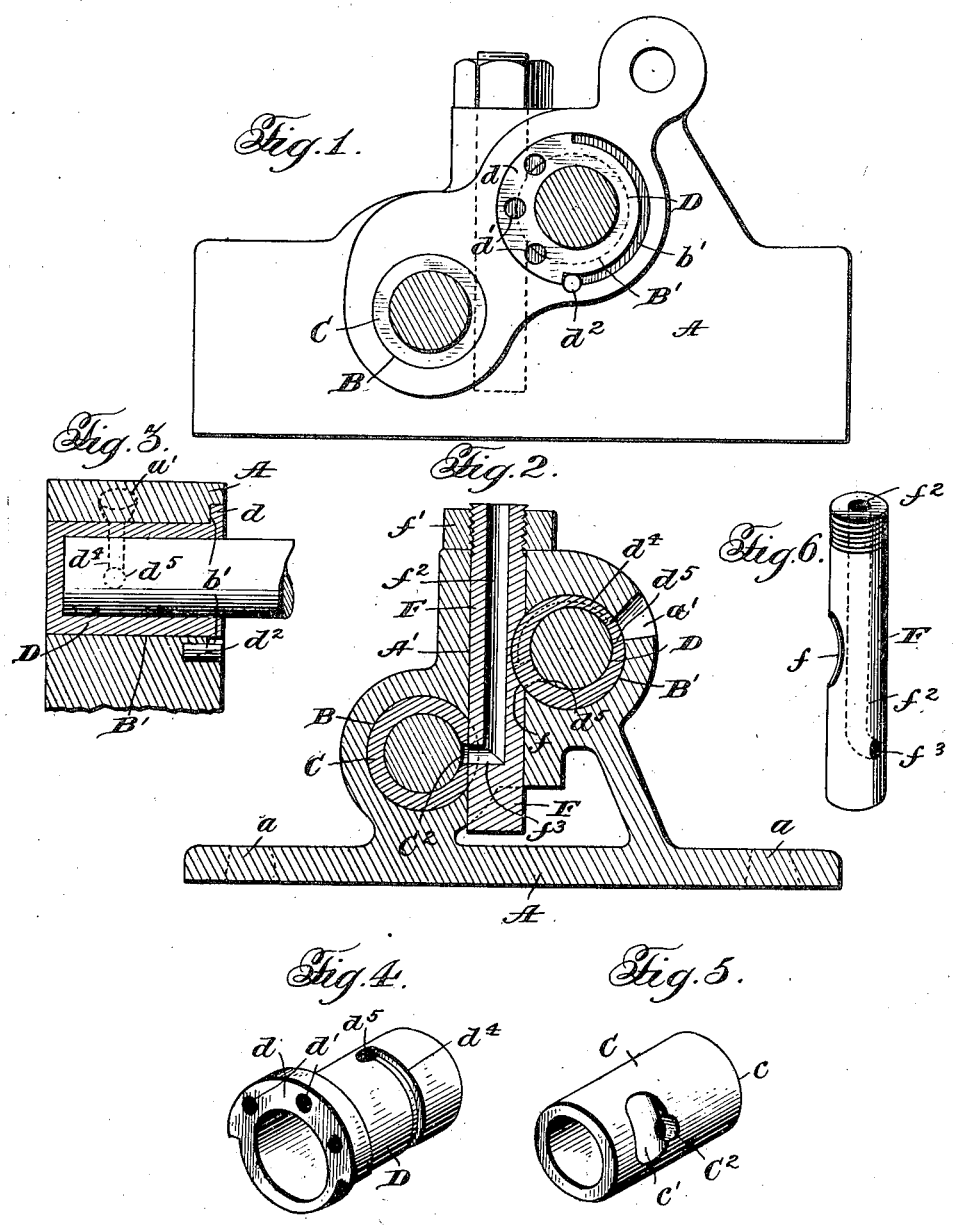

UNITED STATES PATENT OFFICE.

GEORGE F. CRIPPEN, OF YPSILANTI, MICHIGAN.

BEARING FOR SHAFTS.

1,262,925.　　　　　Specification of Letters Patent.　　Patented Apr. 16, 1918.

Application filed December 1, 1916. Serial No. 134,383.

*To all whom it may concern:*

Be it known that I, GEORGE F. CRIPPEN, a citizen of the United States, residing at Ypsilanti, in the county of Washtenaw and State of Michigan, have invented certain new and useful Improvements in Bearings for Shafts, of which the following is a specification, reference being had therein to the accompanying drawing.

This invention relates to an improvement in bearings for shafts and it is designed more particularly as an improvement for use in connection with parallel rolls or gearing which require relative adjustments toward and from each other.

The object of the invention is to provide a bearing member for the ends or shafts, one at least of which members will have an adjustment, and to associate with the members a single means for locking and retaining the bushings or bearing members in position. It has heretofore been suggested in the art of adjustable bearings to employ the eccentric principle of adjustment, the same being applied either to one or to both associated bearings, and the present invention is one appertaining to the eccentric type of adjustment, although its principle may be applied to other types of adjustable bearings.

A further object of the invention is that of the provision of an adjustable bearing with means whereby the bearing member or bushing may be adjusted to any desired position and to be there held against further movement without the employment of detents or spring dogs or other pivotal or relatively weak members.

In the accompanying drawing, there is shown an embodiment of the invention, but various details may be changed and modifications made without departing from the nature and principle of the invention.

In the drawing:—

Figure 1 is an elevation of a bearing member showing the respective bearing bushings in position and the shaft ends in section;

Fig. 2 is a longitudinal sectional elevation of the bearing;

Fig. 3 is a sectional view of the adjustable bushing member.

Fig. 4 is a detail view of the adjustable bushing member,

Fig. 5 is a similar view of the nonadjustable bushing member.

Fig. 6 is a detail section of the locking pin.

In the drawing, A represents a casting or forging constituting the bearing member as a whole. This part A is provided with suitable apertured ears $a$ for attachment to any suitable base. The bearing member A is formed with two associated apertures B and B′ and the former is provided with the removable bushing C conveniently closed at its outer end as at $c$. This bushing is provided adjacent one end with a tangential groove $c'$ of curved section, the curvature corresponding to that of the true circle of the locking member presently to be described. $C^2$ represents an oil opening extending through the wall of the bushing C at a point midway the length of the groove C′, this opening intersecting the groove.

The opening B′ is enlarged at its inner end as at $b'$ forming a chamber and in the opening is positioned an eccentrically formed bushing member D, the same having a loose fit and permitting rotation in the opening. The inner end of the bushing D is provided with a flange $d$ fitting the chamber, the periphery of the flange coinciding with the contour of the chamber wall. The flange is conveniently provided with one or more openings $d'$ and is in extent substantially one half of the circumference of the bushing. $d^2$ represents a stop pin with which the end of the flange engages when the bushing is rotated thus limiting the extent of rotary movement of the bushing. The bushing is conveniently closed at its outer end and is provided intermediate its end with an oil groove $d^4$ extending substantially one half around the circumference and terminating at each end in oil apertures $d^5$ leading to the interior of the bushing. The casting A is provided with an oil inlet $a'$ in which a suitable oil cup may be secured and the oil inlet $a'$ is positioned to register with the oil conducting groove of the bushing. It will be noted that the body of the bushing D is cylindrical, while the bore is eccentric so that by turning the bushing, the shaft end carried thereby will be caused to approach or recede from the companion bearing.

The bearing A is provided with a vertical socket A' extending to a point below the lowermost bushing opening and intersecting both of said openings as shown in Fig. 2. In this socket there is placed a cylindrical pin F having adjacent a point opposite the upper bushing a grooved or curved portion $f$, the curvature of which corresponds with the curvature of the exterior surface of the bushing D. The pin is provided with a threaded upper end which is fitted with a nut $f'$. An oil passage $f^2$ is formed through the center of the pin F, the same terminating in a lateral discharge $f^3$ near the lower end of the pin. This passage is designed to register with the oil opening C² within the bushing C so that the shaft end in the bushing C may be properly lubricated.

In assembling the parts the bushing C is placed in the bearing opening with its tangential groove in line with the vertical bolt receiving opening of the casting so that if the bolt is dropped in place it will enter the groove in the bushing C and thus lock the same against the rotary or longitudinal movement. When the securing bolt is in its proper position the curved groove $f$ will register with the curved walls of the opening B' forming in that respect substantially a part of the curved wall. The bushing D is then inserted into its receiving bearing opening and the bolt is thus locked against the removal owing to the fact that the circular surface of the bushing has entered the groove in the side of the bolt. The curved groove in the side of the bolt is made to exactly fit the bushing D and when the nut on the bolt is tightened up coming in contact with the top of the bearing A, the bolt will be drawn outward, wedging, binding and setting the adjustable bushing firmly in its desired or adjusted position. When it is desired to adjust the bushing D it is only necessary to loosen the nut relieving the pressure between the bushing and the bolt thus permitting the bushing to be turned by the employment of a punch or other means entering one of the holes of the stop flange thereof. If the parallel shaft ends require further spacing apart so as to vary the position of the rolls, the bushing D need only be adjusted. It will be observed that a single bolt or locking member is employed for retaining and securing the bushings in place and that the arrangement is such that a positive holding of the adjustable bushing is secured without resorting to the objectionable dog, detent mechanism, or set screw.

The bushings are closely fitted to the sockets or bearing openings and owing to their closed outer ends there is little danger of the escape of lubricant fed to the bearings. The bearing as a whole represents a very simple, effective and adjustable bearing unit with the minimum number of parts.

Having thus described the invention, what is claimed as new and desired to be secured by Letters Patent is:—

1. In a bearing for shaft ends or the like, the combination with a supporting bearing member having a bearing opening therein, of an eccentrically mounted bushing in the opening and a grooved bolt member embracing a part of the bushing intermediate its ends, with means for drawing the bolt tightly against the bushing to retain the same in adjusted positions.

2. In an adjustable bearing, a cylindrical bushing having an eccentrically positioned bearing therein and a groove member engaging the surface of the bushing for locking the same in place, said groove member having means for drawing the same in a direction transverse of the bushing.

3. In a bearing, the combination with a supporting part and an eccentric bushing having closed outer ends, of means for adjusting the bushing, and a grooved bolt member having a part fitting the surface of the bushing and means for drawing the bolt member crosswise of the bushing for frictionally holding the bushing in position.

4. In a bearing, the combination with a bearing member of associated bushing members removably located therein, one of said bearings having an eccentrically disposed bearing opening, and means for adjusting the eccentrical bushing, and a single means for locking both bushings in position.

5. In a bearing for associated shafts, the combination with a supporting member, of a plurality of bearing bushings removably mounted therein, one of said bushings having provisions for adjustment, and a single reciprocating locking member for retaining the bushings in place.

6. The combination with a supporting bearing member having bushing receiving openings, of bushings in the openings, one of the bushings being provided with a tangential groove in its surface, a bolt adapted to fit the said groove and having a corresponding groove in its surface arranged to receive the other of said bushings, and a nut for setting the bolt in the position to hold the bushings in place.

7. The combination with a bearing member, of a bushing removably positioned therein, and having a grooved side with an oil inlet, of a companion bushing, a bolt engaging both bushings having an oil channel registering with the said oil inlet.

8. In a bearing, the combination with a supporting member, of a bushing member having an eccentrically positioned shaft receiving socket, and a flange, a stop pin with which the flange engages, the body of the bushing having an oil channel therein provided with discharge apertures to the interior of the bushing, means for feeding oil to the channel and means for locking the bushing in different positions for adjustment.

9. In a bearing, the combination with a bushing receiving member, of a bushing having an eccentric bore, the bearing member having a socket passing through the bushing receiving opening tangentially, and a bolt located in said socket having a curved groove located normally at the bushing and into which the bushing passes, and means for moving the bolt longitudinally to clamp the bushing in place.

In testimony whereof I hereunto affix my signature in the presence of two witnesses.

GEORGE F. CRIPPEN.

Witnesses:
WILLIAM B. HATCH,
FREDERICK C. GILLETTE.